United States Patent [19]

Lang

[11] Patent Number: 5,731,403

[45] Date of Patent: Mar. 24, 1998

[54] LOW TEMPERATURE MANUFACTURING PROCESS FOR NYLON

[75] Inventor: James Joseph Lang, Wilmington, Del.

[73] Assignee: E. I. du Pont de Nemours and Company, Wilmington, Del.

[21] Appl. No.: 688,449

[22] Filed: Jul. 30, 1996

Related U.S. Application Data

[63] Continuation-in-part of Ser. No. 344,803, Nov. 23, 1994, abandoned.

[51] Int. Cl.$^6$ ............................................. C08G 69/28

[52] U.S. Cl. .......................... 528/340; 528/335; 528/347; 528/349

[58] Field of Search .......................... 528/335, 340, 528/347, 349

[56] References Cited

U.S. PATENT DOCUMENTS

| | | | |
|---|---|---|---|
| 3,884,881 | 5/1975 | Bice et al. | 528/335 |
| 4,009,153 | 2/1977 | Shin | 528/335 |
| 4,131,712 | 12/1978 | Sprauer | 528/335 |
| 4,433,146 | 2/1984 | Beckers et al. | 544/201 |
| 4,438,257 | 3/1984 | Miyamoto et al. | 528/347 |

*Primary Examiner*—P. Hampton-Hightower

[57] ABSTRACT

This invention concerns a low temperature process for the manufacture of nylon.

12 Claims, No Drawings

1

LOW TEMPERATURE MANUFACTURING PROCESS FOR NYLON

This application is a continuation-in-part of application Ser. No. 08/344,803, filed on Nov. 23, 1994 now abandoned.

FIELD OF THE INVENTION

This invention concerns a low temperature process for the manufacture of nylon.

TECHNICAL BACKGROUND

Some commercially important polyamides, referred herein to as dimonomeric polyamides, require starting monomers of two kinds, one monomer having two carboxylic acid functional reactive groups (a diacid) and the other monomer having two amino functional reactive groups (a diamine). This class of polyamides may incorporate more than one diacid and more than one diamine and may incorporate a small amount, usually no more than 10%, of a third kind of starting material having a carboxylic acid functional group and an amino functional group or a functional precursor to such a compound. In the most common method of preparing dimonomeric polyamides, the starting diacid and diamine components are mixed in stoichiometric proportions in a solution containing a large amount of water, typically up to as much weight of water as the combined weight of the diacid and diamine components. This water is subsequently removed by evaporation which requires a large amount of energy. The evaporation of water is usually done at elevated pressure. After the evaporation, there must be a pressure reduction step which requires heating to retain a molten state. The heating is known to cause discoloration and chemical degradation of the product.

Attempts to produce dimonomeric polyamides without the use of water or other solvents have usually been unsuccessful. If one component is a solid, it is difficult to accurately proportion the solid component. If both components are supplied as liquids (melts), these liquids may experience degradation, as a result of the high temperature required to keep the components in melt form.

U.S. Pat. No. 4,131,712, which is incorporated herein by reference, endeavors to overcome these difficulties. This patent teaches a process for the preparation of a high molecular weight polyamide, wherein a diacid-rich component and a diamine-rich component are prepared separately in non-stoichiometric proportions and then the diacid-rich component and the diamine-rich component are contacted in the liquid state at temperatures which prevent solidification. In U.S. Pat. No. 4,131,712, the equivalence of, for example, the diacid-rich component made from the diacid and the diamine or the salt, made from stoichiometric amounts of the diacid and the diamine, in physical or chemical combinations at the proper ratio, is cited. When the proportions of the total amounts of diacid-rich component and diamine-rich component are as much as possible stoichiometric, the molten components are further heated together to cause polycondensation to form a high molecular weight polyamide. The major utility of the process is in the manufacture of nylon 66. U.S. Pat. No. 4,131,712 is hereby incorporated by reference.

U.S. Pat. No. 4,131,712 identifies the low melting temperatures for diacid-rich and for diamine-rich compositions for which substantial dehydration is avoided. These temperatures, when adipic acid is the diacid and hexamethylenediamine is the diamine, are indicated by the solid line in the Drawing in U.S. Pat. No. 4,131,712, and it can be noted that the low melting temperature for which dehydration is avoided is different at different diacid-rich and diamine-rich compositions. For example, the melt temperature for which dehydration is avoided is 156° C. for a mole ratio of hexamethylenediamine to adipic acid of 80/20, the temperature is about 195° C. for the stoichiometrically balanced mole ratio of 50/50, the temperature is 127° C. for a mole ratio of 26/74, and the lowest melt temperature shown is 98° C. for a molar ratio of 24/76 hexamethylenediamine to adipic acid.

U.S. Pat. No. 4,131,712 also identifies the temperatures required to prevent solidification at complete dehydration for each diacid-rich composition and each diacid-rich composition and for each combined proportion of diacid-rich component and diamine-rich component obtained by contacting portions of the diacid-rich component with portions of the diamine-rich component. For a given combined proportion of diacid-rich component and diamine-rich component, the temperature which prevents solidification at complete dehydration, for adipic acid and hexamethylenediamine is indicated by the dashed line in the Drawing in U.S. Pat. No. 4,131,712. For example, the temperature which prevents solidification is 166° C. for a mole ratio of hexamethylenediamine to adipic acid of 80/20, about 254° C. for a mole ratio of 50/50, the temperature is 174° C. for a mole ratio of 33.3/66.7, and the temperature is 123° C. for a mole ratio of 25/75 hexamethylenediamine to adipic acid. U.S. Pat. No. 4,131,712 excludes operation at temperatures which are lower than the temperature required to prevent solidification at complete dehydration for a given combined proportion of diacid-rich component and diamine-rich component.

U.S. Pat. Nos. 4,433,146 and 4,438,257, teach the use of a partial condenser to condense diamine out of vapor leaving the reaction mixture so as to return the diamine to the reaction mixture. However, the procedure, if used on a commercial scale, with stepwise addition of diamine, appears to require extended periods of time to recycle the diamine.

SUMMARY OF THE INVENTION

The present invention provides a process for the preparation of polyamides in the absence of added aqueous or organic solvents with lower amounts of thermal degradation and diamine loss and with lower equipment costs. This process can achieve stoichiometric balance of diacid-rich and diamine-rich components at temperatures which substantially avoid thermal degradation and vaporization of diamine and at low pressures which do not require more expensive equipment costs. The method comprises the following:

combining a diacid-rich component in a solid or melt state with a diamine-rich component in the melt state in one or more steps such that the temperature is sufficient to retain the resulting mixture in a melt state and for at least a single combined proportion of the components in one or more of the steps is at a temperature lower than that required to prevent solidification at complete dehydration for the combined proportions of diacid and dime, and at a temperature at which the evaporation of diamine is substantially avoided; and after substantial stoichiometric balance is achieved, further heating the resulting mixture to cause polycondensation to a high molecular weight polyamide.

DETAILED DESCRIPTION OF THE INVENTION

A diacid-rich component and a diamine-rich component prepared separately are combined in one or more steps until sufficient amounts of the diacid-rich and the diamine-rich components have been combined to achieve substantial stoichiometric balance. After substantial stoichiometric balance has been achieved starting from the diacid-rich and diamine-rich components, the resulting mixture is further heated to achieve a high molecular weight polyamide of commercial value.

Whereas U.S. Pat. No. 4,131,712 excludes operation at temperatures lower than those required to prevent solidification at complete dehydration for a combined proportion of the diacid-rich component and the diamine-rich component, the current process includes operation in one or more steps in combining the diacid-rich and the diamine-rich components at temperatures lower than those required to prevent solidification at complete dehydration for the given combined proportion of the diacid-rich and diamine-rich components.

The temperatures lower than those which prevent solidification at complete dehydration for the combined proportion of diacid-rich and diamine-rich components retain the combined proportion of diacid-rich and diamine-rich components in the melt state and avoid solidification over reasonable periods of time sufficient for commercial processing. These said temperatures are low enough so that diamine vaporization is substantially avoided in some cases even for pressures as low as atmospheric. At the temperatures and pressures possible, water formed by dehydration will vaporize and can be removed and only a small amount of water will be present in the molten liquid.

Combining the diacid-rich and the diamine-rich components at melt temperatures can result in dehydration of the components which initially may be in a state of no dehydration. Prior to complete dehydration, there is an intermediate degree of hydration. The term "intermediate degree of hydration" describes a state between a first state where no reaction has occurred, i.e. no dehydration, and a second state for which dehydration is substantially complete.

The ability to operate for one or more steps at temperatures lower than those required to prevent solidification at complete dehydration while retaining a melt state and avoiding solidification rests on the low melt temperatures found for combined proportions of diacid-rich and diamine-rich components at intermediate degrees of dehydration and on the low rates of dehydration found at the low melt temperatures.

The temperature lower than that required to prevent solidification at complete dehydration but needed to retain a melt state for a combined proportion of diacid-rich and diamine-rich components will depend on the particular proportion of diacid-rich and diamine-rich components and on the degree of dehydration. The temperature needed to retain a melt and be stable to solidification may change as the combined proportion of diacid-rich and diamine-rich components or as the degree of dehydration changes so that the temperature may not be held constant, but for at least a single combined proportion of diacid-rich and diamine-rich components will include operation at a temperature below that required to prevent solidification at complete dehydration.

Further, it is not only possible for non-stoichiometric combined proportions of diacid-rich and diamine-rich components at intermediate degree of dehydration to operate at temperatures for one or more of the combining steps which are lower than temperatures required to prevent solidification at complete dehydration, but even more surprising, to operate at temperatures for one or more of the combining steps which are lower than the melting temperature of combined proportions of diacid-rich and diamine-rich components for which substantial dehydration is avoided; that is, below the temperatures indicated by the solid line in the Drawing in U.S. Pat. No. 4,131,712.

For substantially stoichiometric combined proportions of the diacid-rich and diamine-rich components at an intermediate degree of dehydration, operation at temperatures which retain the mixture in the melt state below the low melting temperature where substantial dehydration is avoided is also possible. That is, for example, a substantially stoichiometric mixture of adipic acid and hexamethylenediamine, or of nylon 66 salt, which is of inherent stoichiometric proportion, can be held in the melt state at an intermediate degree of dehydration at temperatures below that of the melting temperature wherein substantial dehydration is avoided, which is about 195° C., the melting temperature of the nylon 66 salt itself.

Various processes including continuous processes which have greatest commercial interest are possible which operate at temperatures for one or more non-stoichiometric combined proportions of diacid-rich and diamine-rich components lower than the temperatures required to prevent solidification at complete dehydration or even lower at temperatures lower than the melting temperatures for which substantial dehydration is avoided. For substantially stoichiometric combined proportions of diacid-rich and diamine-rich components or of the stoichiometric salt itself, a process is possible which operates at temperatures lower than the melting temperature for the combined stoichiometric proportion for which substantial dehydration is avoided.

To achieve the desired intermediate degree of dehydration necessary to operate at the low temperatures, one or both the diacid-rich component and the diamine-rich component may be made to undergo dehydration. Or, one or both the diacid-rich component and diamine-rich component, or the stoichiometric salt of the diacid and the diamine, at their respective degree of dehydration may be combined with a substantially stoichiometric combined proportion at a different degree of dehydration to achieve the overall desired intermediate degree of dehydration.

The "degree of dehydration" is the fraction of the maximum potential reactive ends of the minority diacid or diamine component present in the combined proportion of diacid-rich and diamine-rich components which have undergone a water forming reaction to form a chemical combination with the majority component. The number of potential reactive ends can be calculated from the mass of the diacid or diamine component added, and their respective molecular weights. The number of chemically unreacted ends can be found by titration.

EXAMPLE 1

A diacid-rich mixture consisting of 66.7 mole percent adipic acid and 33.3 mole percent hexamethylenediamine (HMD) was prepared by heating 107.4 g adipic acid and 192.6 g nylon 66 salt to a temperature of 155° C. in a 1 liter agitated reaction vessel. To the molten diacid-rich mixture was added 42.2. g of molten, anhydrous HMD to form a combined proportion of 57.1 mole percent adipic acid and 42.9 mole percent HMD at 174° C. and atmospheric pressure. An additional 43.0 g of molten HMD was then added to the reaction vessel to bring the combined proportion of adipic acid and HMD to substantial stoichiometric balance at a temperature of 170° C. at atmospheric pressure. Subsequent heating at higher temperatures resulted in a material with a melting point of about 260° C. indicative of polyamide formation.

Comparison of Example 1 and Example 4 of U.S. Pat. No. 4,131,712

In Example 4 of U.S. Pat. No. 4,131,712, the operating temperature of 182° C. at a molar proportion of 66.7% adipic acid is higher than the temperature of 174° C. for this molar proportion, indicated by the broken-line in the Drawing in U.S. Pat. No. 4,131,712 which represents the temperatures required to prevent solidification at complete dehydration. The temperature of 155° C. in Example 1 at a molar proportion of 66.7% adipic acid is lower than 174° C., the temperature for this molar proportion required to prevent solidification at complete dehydration.

In Example 4 of U.S. Pat. No. 4,131,712, the temperature at a combined molar proportion of 57.1% adipic acid is 250° C. The temperature of 250° C. is higher than the temperature of about 235° C. for a combined proportion of 57.1 mole percent adipic acid indicated by the broken line in the Drawing in U.S. Pat. No. 4,131,712 which represents the temperatures required to prevent solidification at complete dehydration. In the current example, the temperature at a combined proportion of 57.1 mole percent adipic acid is 174° C., which is lower than the operating temperature of 250° C. of Example 4 of U.S. Pat. No. 4,131,712, and which is lower than the temperature of about 235° C., which is the temperature for the given combined proportion required to prevent solidification at complete dehydration.

In Example 4 of U.S. Pat. No. 4,131,712, the temperature for a substantial stoichiometric proportion of the combined diacid-rich and diamine-rich components is 285° C., which from U.S. Pat. No. 4,131,712 is higher than the temperature required to prevent solidification at complete dehydration. The melt temperature for which substantial dehydration is avoided indicated by the solid line in U.S. Pat. No. 4,131,712 for a substantial stoichiometric proportion of adipic acid and HMD is 195° C. The temperature of the current example for the substantial stoichiometric proportion of adipic acid and HMD is 170° C.

Example 1, above, illustrates the ability to combine a diacid-rich component and a diamine-rich component and bring to substantial stoichiometric balance at low temperatures and low pressures as part of a polyamidation process. This example specifically illustrates combining a diacid-rich component and a diamine-rich component at temperatures below the temperatures for combined proportions required to prevent solidification at complete dehydration. The adipic acid-rich component and HMD diamine-rich component are in fact for all combined proportions of the example at temperatures below the temperatures required to prevent solidification at complete dehydration. The low temperatures retain the combined proportions of the diacid-rich and diamine-rich components in the melt state but are lower than those required to prevent solidification. The pressure at all times in Example 1 is atmospheric.

Furthermore, for the combined proportion of 57.1 mole percent adipic acid and 42.9 mole percent HMD, and for the substantially stoichiometric combined proportion, the temperatures respectively of 174° C. and 170° C. are also below the melting temperatures for which dehydration is avoided, which from the solid line in the Drawing in U.S. Pat. No. 4,131,712 for these combined proportions are about 182° C. and 195° C., respectively.

EXAMPLE 2

Molten, anhydrous HMD was added to an agitated reaction vessel containing 225 grams of a molten diacid-rich mixture consisting of 81% by weight of adipic acid and 19% by weight of hexamethylenediamine at 145° C. The reactor pressure was 9 psig, maintained by a slight nitrogen flow to the reactor. While adding HMD to the reactor, the temperature never exceeded 184° C. After 102 grams of HMD were added to the vessel, a sample was taken from the vessel. The vessel temperature at the time the sample was taken was 168° C., and the vessel contents were clear and boiling was occurring. Since vaporization of HMD at this temperature is known to be minimal, the boiling is indicative of reaction (dehydration) occurring which liberates water as a by-product and must be removed. Testing of the sample taken indicates a substantially stoichiometric balanced composition with a water content of 0.73% by weight and at a degree of dehydration of 0.39. The reactor contents were subsequently heated to high temperatures to form a polyamide.

This example illustrates the ability to achieve stoichiometric balance from a diacid-rich component and a diamine-rich component at low pressures and at temperatures low enough to avoid substantial diamine vaporization en route to polyamide formation. This example also illustrates the ability to combine non-stoichiometric proportions of the diacid-rich component and the diamine-rich component beginning at temperatures which are greater than those required to prevent solidification at complete dehydration, but then operating at temperatures for one or more combined proportions of the diacid-rich and the diamine-rich components which are lower than those required to prevent solidification at complete dehydration. For substantially stoichiometric proportions at a degree of dehydration of 0.39, the temperature of 168° C. is lower than the melting temperature for which substantial dehydration is avoided.

EXAMPLE 3

A diacid-rich mixture of 158.3 grams comprising 81% adipic acid and 19% HMD by weight made from the proper amounts of adipic acid and nylon 66 salt was melted in an agitated reaction vessel. Molten anhydrous HMD at 50° C. was added to the reaction vessel. The vessel pressure was atmospheric. When a substantial stoichiometric proportion was reached, the temperature was 180° C. and a sample was taken. Twenty minutes later, the vessel contents were clear, the vessel temperature was 170° C., the vessel pressure was still atmospheric, and another sample was taken. The first sample indicates a degree of dehydration of 0.26 and the latter sample indicates a degree of dehydration of 0.47.

This example illustrates the ability to balance a diacid-rich component with a diamine-rich component at atmospheric pressure and at temperatures low enough to avoid substantial diamine vaporization. The temperatures for non-stoichiometric, combined proportions of the diacid-rich component and the diamine-rich component include temperatures lower than those required to prevent solidification at complete dehydration, while for substantially stoichiometric proportions at an intermediate degree of dehydration, the temperature is lower than that for which substantial dehydration is avoided. This example also illustrates the ability to hold the combined proportions of diacid-rich and diamine-rich components for a length of time of 20 minutes at temperatures lower than those required to prevent solidification at complete dehydration without solidification occurring.

EXAMPLE 4

A mixture of 296 g comprising 77 weight percent adipic acid and 23 weight percent HMD was brought to a clear melt at a temperature of 140° C. in the reaction vessel of Example 1. The temperature was then lowered over approximately the next 2 hours until the melt reached a temperature of about 95° C., and held at a temperature within 1° C. of 95° C. for approximately the following 2.5 hours. The temperature was then raised to about 160° C., and sufficient molten, anhydrous HMD was added to achieve substantial stoichiometric balance, with the temperature not exceeding 178° C. and the pressure not exceeding about 10 psig. When stoichiometric balance was reached, the temperature was 173° C. Subsequent heating resulted in a material with a melting temperature of about 263° C., which is indicative of polyamide formation.

This example illustrates the ability to heat a diacid-rich component to temperatures exceeding the temperature required to prevent solidification at complete dehydration, and to combine the diacid-rich component with diamine-rich component at low pressures and at temperatures including those below the temperatures for combined proportions required to prevent solidification at complete dehydration, and for the stoichiometric balanced proportion, at a temperature below the temperature for which substantial dehydration is avoided.

Furthermore, this example illustrates the ability to hold the diacid-rich component for an extended period of time (here, exceeding 2 hours) which can be of commercial advantage. The holding temperature in this example of approximately 95° C. is lower than the melting temperature for which substantial dehydration is avoided for any diacid-rich proportion of adipic acid and HMD.

EXAMPLE 5

A diacid-rich mixture of 65 weight percent adipic acid and 35 weight percent HMD was prepared in the reaction vessel of Example 1. Molten HMD was added to bring the combined proportion of about 470 g to substantial stoichiometric balance at a temperature of 171° C. and atmospheric pressure.

Nylon 66 salt in the solid state was then added at a rate of about 8.5 g/min to the reaction vessel which was at substantial stoichiometric balance. For the time that salt was fed to the top of the reactor, molten material was withdrawn from the bottom of the reactor at a rate which endeavored to keep the volume in the reactor constant. For a period of more than 20 minutes, salt was fed to the reactor and molten product was withdrawn from the reactor. The temperature of the reactor contents varied from 163° C. to 171° C. The reactor was open to the atmosphere through one port and a slight vacuum was applied to another port to remove the water vapor formed in the dehydration reaction. Water formation caused some degree of foaming in the reactor. After more than 20 minutes of salt feed, operation was terminated due to excessive foaming and difficulty in adding further amounts of salt.

This Example illustrates the ability of a stoichiometric feed (the nylon 66 salt) to be combined with a stoichiometrically proportioned mixture at a higher degree of dehydration (the reactor contents) in a single step to form a stoichiometric combined proportion at an intermediate degree of dehydration at a temperature below the melting temperature of 195° C. of the stoichiometric salt for which substantial dehydration is avoided.

Suitable control of the degree of dehydration for a continuous operation of a process with stoichiometric feed may be achieved by controlling the degree of dehydration of the individual diacid-rich or diamine-rich components or by combining one or both of the components combined in stoichiometric proportion or of the stoichiometric salt of the diacid and the diamine with a further substantially stoichiometric component at a different degree of dehydration.

What is claimed is:

1. A process for manufacturing nylon 66 comprising: combining an adipic acid-rich component in a solid or melt state with a hexamethylenediamine-rich component in the melt state in one or more steps, such that the temperatures are sufficient to retain the resulting mixture in a melt state and for at least a single combined proportion of the components is at a temperature lower than that required to prevent solidification at complete dehydration for the combined proportions of adipic acid and hexamethylenediamine, and for at least a single combined proportion of the components is at a temperature below the temperature indicated for that proportion on the curve defined by the points 123° C. for a 25/75 hexamethylenediamine/adipic acid mole ratio, 174° C. for a 33/67 hexamethylenediamine/adipic acid mole ratio, 254° C. for a 50/50 hexamethylenediamine/adipic acid mole ratio and 166° C. for a 80/20 hexamethylenediamine/adipic acid mole ratio, said temperature also being that at which the evaporation of diamine is substantially avoided; and, after substantial stoichiometric balance is achieved, further heating the resulting mixture to cause polycondensation.

2. The process of claim 1 wherein the adipic acid-rich component consists of adipic acid and hexamethylenediamine in molar proportion greater than 1.

3. The process of claim 1 wherein the adipic acid-rich component consists of adipic acid and hexamethylenediamine in molar proportion of about 3:1.

4. The process of claim 1 wherein the adipic acid-rich component and the hexamethylenediamine-rich component are contacted in non-stoichiometric combined proportion at temperatures lower than those required to prevent solidification, at complete dehydration.

5. The process of claim 1 wherein the adipic acid-rich component and the hexamethylenediamine-rich component are contacted in non-stoichiometric combined proportion at temperature lower than the melt temperatures for the combined proportion wherein substantial dehydration is avoided.

6. The process of claim 1 wherein the adipic acid-rich component or the hexamethylenediamine-rich component at an intermediate degree of dehydration is at a temperature lower than the melt temperature for the component wherein substantial dehydration is avoided.

7. The process of claim 1 wherein the proportion of the adipic acid-rich component and the hexamethylenediamine-rich component are contacted in substantially stoichiometric combined proportion at temperatures lower than the melt temperature for the combined stoichiometric proportion wherein substantial dehydration is avoided.

8. The process of claim 1 wherein the adipic acid rich component and the hexamethylenediamine rich component are contacted in substantially stoichiometric combined proportion for degrees of dehydration between about 0.15 and 0.60 and at a temperature lower than the melt temperature of about 195° C. of the nylon 66 salt wherein substantial dehydration is avoided.

9. The process of Clam 1 wherein adipic acid and hexamethylenediamine are contacted in substantially stoichiometric combined proportion for degree of dehydration between about 0.25 and 0.50 and at temperatures lower than about 180° C. for which at atmospheric pressure substantial vaporization of hexamethylenediamine is avoided.

10. A process for manufacturing nylon comprising: combining a stoichiometric salt of a diacid and a diamine in solid form with a melt of a stoichiometrically balanced mixture of the diacid and the diamine in one or more steps at a temperature sufficient to retain the resulting mixture in the melt state and at a temperature lower than the melting temperature of the stoichiometric combined proportion of the diacid and the diamine for which substantial dehydration is avoided, and at a temperature at which the evaporation of diamine is substantially avoided; and then heating further to cause polycondensation.

11. The process of claim 1 or claim 10 conducted at essentially atmospheric pressure.

12. The process of claim 1 or claim 10 conducted in the absence of water.

* * * * *